United States Patent
He

(10) Patent No.: US 12,470,352 B2
(45) Date of Patent: Nov. 11, 2025

(54) CONTROL CHANNEL DETERMINATION METHOD AND APPARATUS, AND STORAGE MEDIUM AND PROCESSOR

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/896,988

(22) Filed: Aug. 26, 2022

(65) Prior Publication Data
US 2022/0416980 A1    Dec. 29, 2022

Related U.S. Application Data

(63) Continuation of application No. PCT/CN2020/077237, filed on Feb. 28, 2020.

(51) Int. Cl.
| | |
|---|---|
| *H04L 5/00* | (2006.01) |
| *H04W 72/044* | (2023.01) |
| *H04W 72/23* | (2023.01) |

(52) U.S. Cl.
CPC ......... *H04L 5/0053* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | |
|---|---|---|
| 2018/0288749 A1 | 10/2018 | Sun et al. |
| 2019/0223159 A1 | 7/2019 | John Wilson et al. |
| | (Continued) | |

FOREIGN PATENT DOCUMENTS

| | | |
|---|---|---|
| CN | 109392140 A | 2/2019 |
| CN | 109691206 A | 4/2019 |
| | (Continued) | |

OTHER PUBLICATIONS

International Search Report and Written Opinion with English Translation for PCT Application PCT/CN2020/077237 mailed Nov. 18, 2020. (14 pages).

InterDigital Inc., Coreset Monitoring Under Dynamic Change of BWP, 3GPP TSG RAN WG1 NR Ad-Hoc #2, R1-1710872, Jun. 27-30, 2017. (5 pages).

(Continued)

*Primary Examiner* — Mohammad S Adhami
(74) *Attorney, Agent, or Firm* — Young Basile Hanlon & MacFarlane, P.C.

(57) ABSTRACT

Described are a control channel determination method and apparatus, and a storage medium and a processor. The method comprises: a terminal receiving at least one piece of first control resource set (CORESET) information; the terminal determining, according to the at least one piece of first CORESET information and a first resource, at least one piece of second CORESET information corresponding to the first resource; and the terminal receiving, according to the at least one piece of second CORESET information, a physical downlink control channel (PDCCH). The present invention solves the technical problem in the relevant art of it not being possible to improve the reception performance of a physical downlink control channel (PDCCH).

16 Claims, 6 Drawing Sheets

(56) References Cited

U.S. PATENT DOCUMENTS

| | | | |
|---|---|---|---|
| 2020/0029310 A1 | 1/2020 | Lee et al. | |
| 2020/0092866 A1* | 3/2020 | Xue | H04W 72/04 |
| 2020/0100248 A1* | 3/2020 | Kim | H04L 1/003 |
| 2022/0078834 A1* | 3/2022 | Wu | H04L 27/0006 |
| 2022/0124686 A1* | 4/2022 | Lee | H04L 1/00 |

FOREIGN PATENT DOCUMENTS

| | | | |
|---|---|---|---|
| CN | 110035511 A | 7/2019 | |
| CN | 110351840 A | 10/2019 | |
| CN | 110474751 A | 11/2019 | |
| CN | 110536437 A | 12/2019 | |
| CN | 110798866 A | 2/2020 | |
| EP | 3606241 A1 | 2/2020 | |
| WO | 2018143784 A1 | 8/2018 | |
| WO | 2018184875 A1 | 10/2018 | |
| WO | 2019097643 A1 | 5/2019 | |
| WO | 2019136656 A1 | 7/2019 | |

OTHER PUBLICATIONS

3GPP TS 38.213 V15.3.0 (Sep. 2018); Technical Specification Group Radio Access Network; Physical layer procedures for control; NR; Release 15. (101 pages).

3GPP TS 38.331 V15.3.0 (Sep. 2018); Technical Specification Group Radio Access Network; Radio Resource Control (RRC) protocol specification; NR; Release 15. (444 pages).

Huawei, HiSilicon, Coreset configuration and search space design, 3GPP TSG RAN WG1 Meeting #90bis, R1-1717062, Oct. 9-13, 2017. (14 pages).

Chinese First Office Action with English Translation for CN Application 202210861685.3 mailed Jul. 18, 2023. (18 pages).

Extended European Search Report for EP Application 20920797.6 mailed Feb. 21, 2023. (13 pages).

Chinese Second Office Action with English Translation for CN Application 202210861685.3 mailed Oct. 28, 2023. (17 pages).

Communication pursuant to Article 94(3) EPC for EP Application 20920797.6 mailed Nov. 9, 2023. (7 pages).

European Second Examination report forEuropean Patent Application No. 20920797.6, mailed Apr. 19, 2024, 5 pages.

* cited by examiner

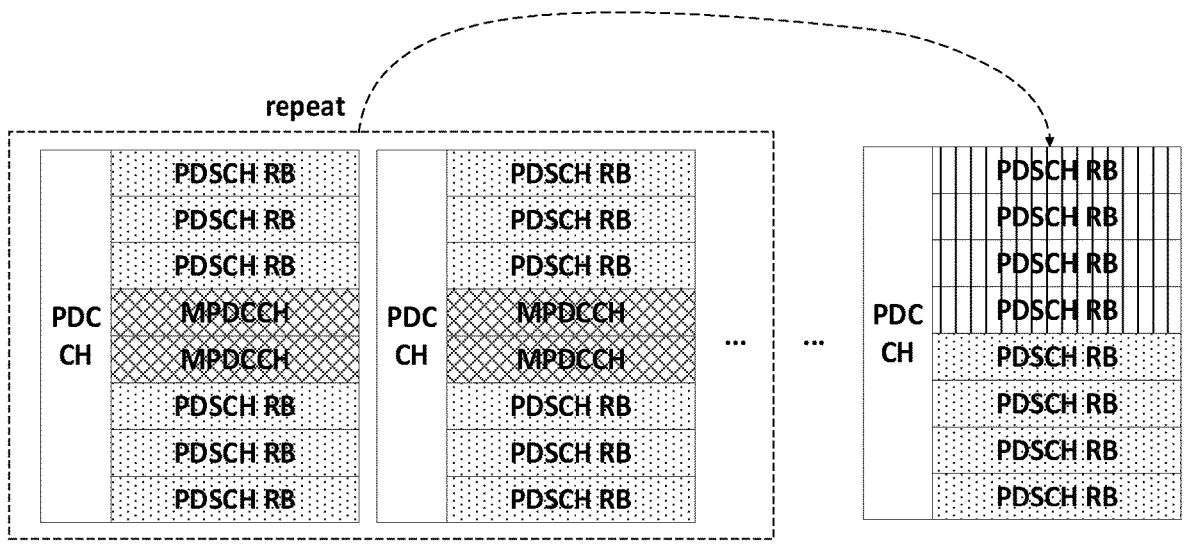

FIG. 7

```
                the network device may send at least one first CORESET
            information. The at least one first CORESET information and the
            first resource are configured to enable the terminal to determine at     S802
            least one second CORESET information corresponding to the first
                                        resource the network device may send the PDCCH. The at least one second
                CORESET information is configured to enable the terminal to          S804
                                    receive the PDCCH.
```

FIG. 8

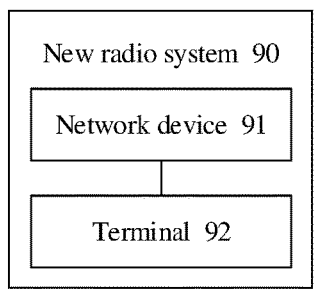

FIG. 9

CONTROL CHANNEL DETERMINATION METHOD AND APPARATUS, AND STORAGE MEDIUM AND PROCESSOR

CROSS-REFERENCE TO RELATED APPLICATION(S)

The present application is a continuation-application of International (PCT) Patent Application No. PCT/CN2020/077237, filed on Feb. 28, 2020, the entire contents of which are hereby incorporated by reference.

TECHNICAL FIELD

The present disclosure relates to the field of communication, and in particular to a method and a device for determining a control channel, a storage medium and a processor.

BACKGROUND

Currently, a user equipment (UE), which supports a low bandwidth capability, usually has low power consumption and low costs. However, there is no specific consideration for the above-mentioned equipment which supports the low bandwidth capability to access a network. For example, in configuration information of a search space of a Physical Downlink Control Channel (PDCCH), with respect to configuration of control resource set (CORESET) information, a broadband, which can be supported by the UE having the low bandwidth capability, is absent. Therefore, frequency hopping and repetition of PDCCH resource cannot be supported, and a technical problem that reception performance of the PDCCH cannot be improved may exist.

No effective solution has been proposed to solve the above technical problem that reception performance of the PDCCH cannot be improved.

SUMMARY

According to an embodiment of the present disclosure, a method for determining a control channel is provided and includes: receiving, by a terminal, at least one first control resource set (CORESET) information; determining, by the terminal, at least one second CORESET information corresponding to a first resource based on the at least one first CORESET information and the first resource; and receiving, by the terminal, a physical downlink control channel (PDCCH) based on the at least one second CORESET information.

According to an embodiment of the present disclosure, a method of determining a control channel is provided and includes: sending, by a network device, at least one first control resource set (CORESET) information, wherein the at least one first CORESET information and a first resource are configured to enable a terminal to determine at least one second CORESET information corresponding to the first resource; and sending, by the network device, a physical downlink control channel (PDCCH), wherein the at least one second CORESET information is configured to enable the terminal to receive the PDCCH.

According to an embodiment of the present disclosure, an apparatus for determining a control channel, configured in a terminal. The apparatus includes: a first receiving unit, configured to receive at least one first control resource set (CORESET) information; a determination unit, configured to determine at least one second CORESET information corresponding to a first resource based on the at least one first CORESET information and the first resource; and a second receiving unit, configured to receive a physical downlink control channel (PDCCH) based on the at least one second CORESET information.

According to an embodiment of the present disclosure, an apparatus for determining a control channel is provided and is configured in a network device. The apparatus includes: a first sending unit, configured to send at least one first control resource set (CORESET) information, wherein the at least one first CORESET information and a first resource are configured to enable a terminal to determine at least one second CORESET information corresponding to the first resource; and a second sending unit, configured to send a physical downlink control channel (PDCCH), wherein the at least one second CORESET information is configured to enable the terminal to receive the PDCCH.

According to an embodiment of the present disclosure, a new radio system is provided and includes a network device and a terminal. The network device is configured to send at least one first control resource set (CORESET) information. The terminal is configured to receive the at least one first CORESET information, determine at least one second CORESET information corresponding to a first resource based on the at least one first CORESET information and the first resource. The network device send is further configured to send a physical downlink control channel (PDCCH), and the terminal is further configured to receive the PDCCH based on the at least one second CORESET information.

According to an embodiment of the present disclosure, a storage medium is provided and includes a stored program. The program, when being run, is configured to control a device which has the storage medium to perform the method of any one of the above embodiments.

According to an embodiment of the present disclosure, a processor is provided and is configured to run a program. The program, when being run, is configured to perform the method of any one of the above embodiments.

According to an embodiment of the present disclosure, an electronic device is provided and includes a memory and a processor. The memory has a computer program stored therein, and the processor is configured to run the computer program to perform the method of any one of the above embodiments.

According to an embodiment of the present disclosure, a chip is provided and includes a processor. The processor is configured to invoke a computer program from a memory and run the computer program to enable a device that is installed with the chip to perform the method of any one of the above embodiments.

According to an embodiment of the present disclosure, a computer program product is provided and includes computer program instructions. The computer program instructions are configured to cause a computer to perform the method of any one of the above embodiments.

According to an embodiment of the present disclosure, a computer program is provided. The computer program is configured to cause the computer to perform the method of any one of the above embodiments.

BRIEF DESCRIPTION OF DRAWINGS

Accompanying drawings illustrated herein are used to provide further understanding of the present disclosure and form a part of the present disclosure. Illustrative embodiments of the present disclosure and descriptions thereof are provided to explain the present disclosure and shall not be interpreted as limiting the scope of the present disclosure inappropriately.

FIG. 7 is a schematic view of an MPDCCH supporting repetition in a plurality of subframes according to an embodiment of the present disclosure.

FIG. 8 is a flow chart of another method for determining a control channel according to an embodiment of the present disclosure.

FIG. 9 is a schematic view of a new radio system according to an embodiment of the present disclosure.

DETAILED DESCRIPTION

Figure 1:
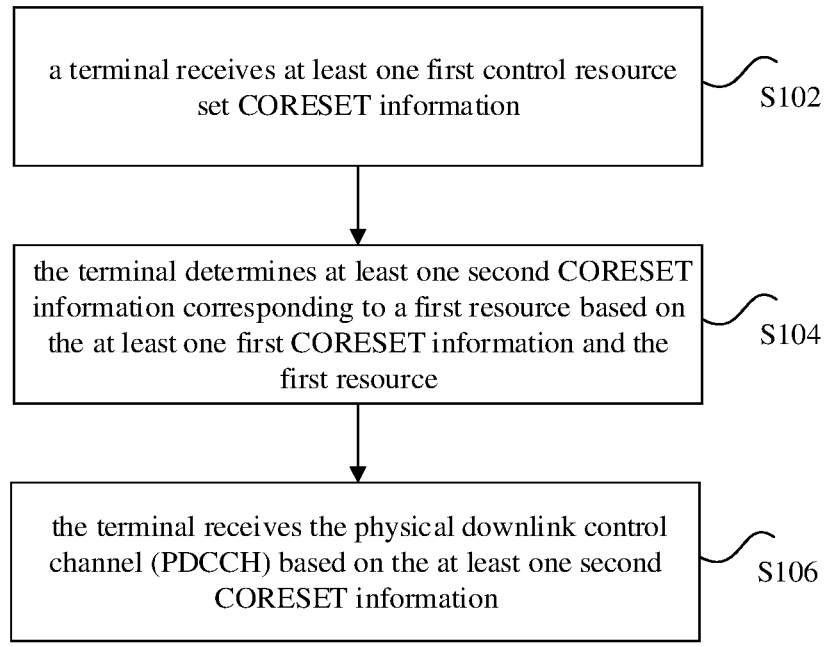
FIG. 1 is a flow chart of a method for determining a control channel according to an embodiment of the present disclosure.

In order to enable ordinary skilled persons in the art to better understand solutions of the present disclosure, technical solutions in the embodiments of the present disclosure will be described clearly and completely by referring to the accompanying drawings in the embodiments of the present disclosure. Apparently, the described embodiments are only a part of but not all of the embodiments of the present disclosure. Based on the embodiments of the present disclosure, all other embodiments obtained by any ordinary skilled person in the art without creative work shall fall within the scope of the present disclosure. To be noted that terms "first" and "second" in the description and claims of the present disclosure and the above-mentioned drawings are used to distinguish similar components, and not used to describe a specific sequence or order. To be understood that data used in this way can be interchanged under appropriate circumstances, such that the embodiments of the present disclosure described herein can be implemented in a sequence other than the sequence described herein. In addition, terms "including" and "having" and any variations thereof are intended to cover non-exclusive inclusions. For example, a series of operations or units included in a process, a method, a system, a product, or a device are not limited to those clearly listed. Those operations or units may include other steps or units that are not clearly listed or are inherent to the process, the method, the system, the product, or the device.

Technical solutions of the embodiments of the present disclosure may be applied to various communication systems, such as: a Global System of Mobile Communication (GSM) system, a Code Division Multiple Access (CDMA) system, a Wideband Code Division Multiple Access (Wideband Code Division Multiple Access) system, a general packet radio service (GPRS), a Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system or a 5G system, and so on.

Exemplarily, a communication system for the embodiments of the present disclosure may include a network device, and the network device may be a device that communicates with a terminal device (or named as a communication terminal or a terminal). The network device may provide a communication coverage for a specific geographic area, and may communicate with a terminal device located in the coverage area. Alternatively, the network device may be a base transceiver station (BTS) in the GSM system or the CDMA system, or a base station (NodeB, referred to as NB) in the WCDMA system, or an evolutional NodeB (eNB or eNodeB) in the LTE system, or a wireless controller in a cloud radio access network (CRAN). Alternatively, the network device may be a mobile switching center, a relay station, an access point, a vehicle-mounted device, a wearable device, a hub, a switcher, a bridge, a router, a network device in the 5G network, or a network device in a future evolutional public land mobile network (PLMN), and so on.

The communication system further includes at least one terminal device located within the coverage area of the network device. As used herein, the "terminal device" includes, but is not limited to, connection via wired lines, such as via public switched telephone networks (PSTN), Digital Subscriber Line (DSL), digital cables, and direct cable connections; and/or another data connection/network; and/or via a wireless interface, such as for cellular networks, wireless local area networks (Wireless Local Area Network, referred to as WLAN), digital TV networks such as DVB-H networks, satellite networks, AM-FM broadcasting transmitter; and/or a device of another terminal device configured to receive/send communication signals; and/or an Internet of Things (IoT) device. A terminal device set to communicate through a wireless interface may be referred to as a "wireless communication terminal", a "wireless terminal" or a "mobile terminal". Examples of the mobile terminal may include, but are not limited to, satellite or cellular phones; Personal Communications System (PCS) terminals that can combine cellular radio phones with data processing, fax, and data communication capabilities; a PDA that can include a radio phone, a pager, Internet/intranet access, a Web browser, a memo pad, a calendar, and/or a Global Positioning System (GPS) receiver; and a conventional laptop and/or palmtop receiver or other devices including radio telephone transceivers. The terminal device may refer to an access terminal, a user equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a wireless local loop (WLL) station, a personal digital assistant (PDA), a handheld device having wireless communication functions, a computing device or other processing devices connected to a wireless modem, a vehicle-mounted device, a wearable device, a terminal device in the 5G network, or a terminal device in the future evolutional PLMN, and so on.

Alternatively, D2D communication may be performed between terminal devices. Alternatively, the 5G system or the 5G network may also be referred to as an NR system or an NR network. Alternatively, the communication system may further include a network controller, a mobility management entity, and other network entities, which will not be limited by embodiments of the present disclosure. To be understood that the device having the communication function in the network/system in the embodiments of the present disclosure may be referred to as a communication device. The communication device may include a network device and a terminal device having communication functions. The network device and the terminal device may be the device described above, which will not be repeated herein. The communication device may further include other devices in the communication system, such as a network controller and other network entities such as a mobile management device, which will not be limited by the embodiments of the present disclosure. To be understood that terms "system" and "network" in the present disclosure may be used interchangeably. The term "and/or" in present disclosure describes only an associated relationship between the related objects, and may indicate three types of relationships. For example, A and/or B may indicate three situations: A alone is present, A and B are present at the same time, and B alone is present. In addition, the character "/" in the present disclosure indicates that associated objects before and after the character are in an "or" relationship.

According to an embodiment of the present disclosure, a method for determining a control channel is provided. To be noted that operations shown in the flow chart of the accompanying drawings can be executed in a computer system such as a set of computer-executable instructions. Although a logical sequence is shown in the flow chart, in some cases, the shown or described operations may be performed in another sequence. The method for determining the control channel in the terminal device according to the embodiment of the present disclosure will be introduced below. FIG. 1 is a flow chart of a method for determining a control channel according to an embodiment of the present disclosure. As shown in FIG. 1, the method includes the following operations.

In an operation S102, a terminal receives at least one first control resource set CORESET information.

In the operation S102 of the present disclosure, the terminal may receive at least one first CORESET information sent from a network device. The at least one first CORESET information may be included in configuration information of a search space. The search space may be informed to the terminal by the network device via Radio Resource Control (RRC) signaling to instruct the terminal to detect the physical downlink control channel (PDCCH) on a corresponding time-frequency resource.

The at least one first CORESET information of the present embodiment is configured to carry a resource block (RB) occupied by the PDCCH in a frequency-domain and the number of orthogonal frequency division multiplexing (OFDM) symbols occupied by the PDCCH in a time-domain. Frequency hopping may occur between different first CORESET information. The network device may be a base station.

In an operation S104, the terminal determines at least one second CORESET information corresponding to a first resource based on the at least one first CORESET information and the first resource.

In the operation S104 of the present disclosure, after the terminal receives the at least one CORESET information, the terminal determines the at least one second CORESET information corresponding to the first resource based on the at least one first CORESET information and the first resource. That is, the at least one first CORESET information of the present embodiment is switched to the at least one second CORESET information.

In the present embodiment, the first resource may include a first time-domain resource or a first frequency-domain resource. The terminal may obtain the first time-domain resource. The first time-domain resource may be a time unit (time point). The terminal may determine at least one second CORESET information corresponding to the first time-domain resource based on the received at least one first CORESET information and the first time-domain resource. Alternatively, the terminal may obtain the first frequency-domain resource. The frequency-domain resource may be a frequency-domain sub-band. The terminal may determine at least one second CORESET information corresponding to the first frequency-domain resource based on the received at least one first CORESET information and the first frequency-domain resource. The at least one second CORESET information corresponding to the first time-domain resource or the first frequency-domain resource may be configured to perform detection on the physical downlink control channel PDCCH of the terminal, such that a terminal, which has a low bandwidth capability, accessing the network may be adapted, and narrowband transmission of the terminal may be supported. The narrowband is relative to a broadband, and may be a sub-broadband included in a normal broadband.

In an operation S106, the terminal receives the physical downlink control channel (PDCCH) based on the at least one second CORESET information.

In the operation S106 of the present disclosure, after the terminal determines the at least one second CORESET information corresponding to the first resource, the terminal may receive the PDCCH based on the at least one second CORESET information. For example, the terminal may detect the PDCCH on the corresponding time-frequency resource based on the at least one second CORESET information.

In the present embodiment, the PDCCH is configured to carry downlink control signaling (DCI) information, and the terminal may receive the DCI information through the PDCCH. According to various formats of the carried DCI, the terminal may receive various DCI information to implement various controls. For example, the DCI information may include downlink scheduling information, uplink scheduling information, and time slot format indication information.

According to the operations S102 to S106 of the present disclosure, the terminal, which has the low bandwidth capability, accessing the network may be adapted, and a technical effect of improving the reception performance of the PDCCH may be achieved. Therefore, the technical problem that reception performance of the PDCCH cannot be improved may be solved.

The above method of the present embodiment will be further introduced below. In an implementation, the at least one first CORESET information belongs to a same bandwidth part (BWP), and/or at least one second CORESET information belongs to a same BWP.

In the present embodiment, the at least one first CORESET information belongs to the same bandwidth part (BWP). That is, each BWP may be configured with at least one first CORESET information, and frequency modulation may be performed among different first CORESET information. Alternatively, the at least one second CORESET information belongs to the same BWP, and that is, each BWP may be configured with at least one second CORESET information.

The above-mentioned BWP in the present embodiment is a set of consecutive resource blocks in a carrier bandwidth. The BWP is configured to prevent the terminal from always working in the entire carrier bandwidth. Especially, the terminal having the low bandwidth capability may support limited bandwidth, and therefore, the terminal may be unable to work on the broadband. Therefore, introduction of the BWP may enable the terminal having the low bandwidth capability to support more flexible working bandwidth, reducing complexity and power consumption of the terminal. Alternatively, the network device of the present embodiment may configure maximum 4 uplink BWPs and maximum 4 downlink BWPs for the terminal in a connected state. An activated BWP may allow the terminal to perform data transmission thereon. The activated BWP may be switched between various BWPs. On each downlink BWP, each terminal may be configured with up to 3 CORESTs and up to 10 search spaces.

In the art, each BWP is configured with maximum 3 CORESET information, and in configuration information for the search space only, one of the maximum 3 CORESET information is associated. The CORESET information is fixed. In the present embodiment, the plurality of first CORESET information included in each BWP configuration may be configured to configure positions of the plurality of first CORESET information within the frequency-domain of the BWP. The at least one second CORESET information corresponding to the first resource may be determined through the plurality of first CORESET information. That is, the CORESET information may be switched, such that narrowband transmission of the terminal may be supported.

In an implementation, the first resource includes the first time-domain resource. In case that the terminal determines the at least one second CORESET information corresponding to the first time-domain resource based on the at least one first CORESET information and the first time-domain resource, at least one first CORESET information in the at least one first CORESET information may be different from at least one second CORESET information in the at least one second CORESET information.

In the present embodiment, in case that the at least one first CORESET information belongs to the same BWP, and/or in case that the at least one second CORESET information belongs to the same BWP, the terminal may determine the at least one second CORESET information corresponding to the first time-domain resource based on the at least one first CORESET information and the first time-domain resource. The determined at least one second CORESET information may be at least one second CORESET information which is obtained from the at least one first CORESET information due to a change of the first time-domain resource and corresponds to the changed first time-domain resource. At least one first CORESET information in the at least one first CORESET information may be different from at least one second CORESET information in the at least one second CORESET information. That is, the at least one first CORESET information may change with time, the second CORESET information may be obtained from the first CORESET information based on the first time-domain resource, and the second CORESET information may be different from the first CORESET information.

In an implementation, for the operation S102, the terminal receiving the at least one first CORESET information includes: the terminal obtaining the at least one first CORESET information through the configuration information of the BWP.

In the present embodiment, the terminal may obtain the at least one piece of first CORESET information through the configuration information of the BWP. That is, at least one first CORESET information may be configured in each configuration information of the BWP. The at least one first CORESET information may be in a valid state or an active state at various time points, such that the terminal may determine the at least one second CORESET information corresponding to the first time-domain resource based on the at least one first CORESET information and the first time-domain resource. The at least one second CORESET information may be valid, and the PDCCH may be detected based on the at least one valid second CORESET information.

Figure 2:
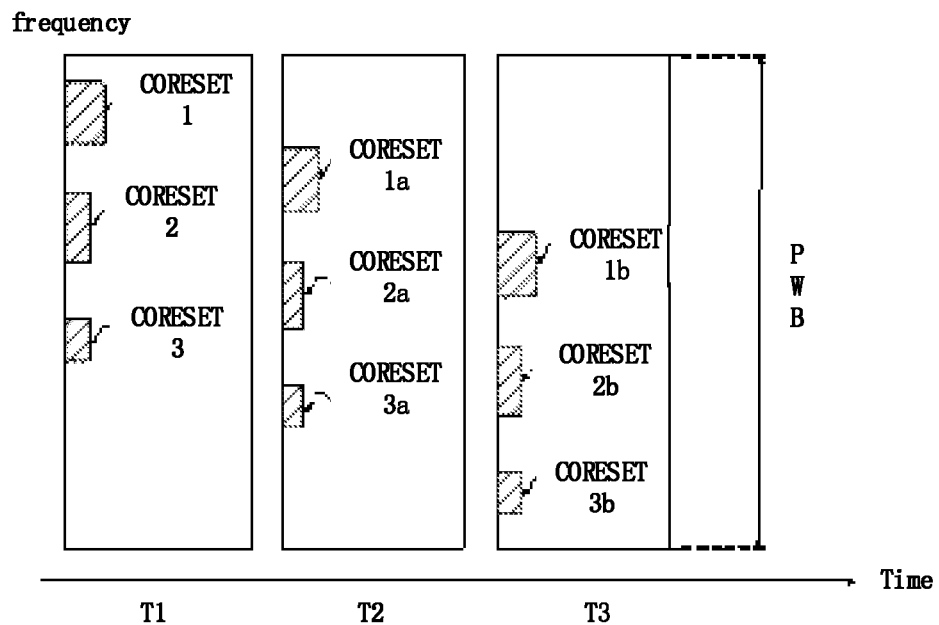
FIG. 2 is a schematic view of determining CORESET information through BWP configuration information according to an embodiment of the present disclosure.

FIG. 2 is a schematic view of determining CORESET information through BWP configuration information according to an embodiment of the present disclosure. As shown in FIG. 2, in a same BWP configuration, 9 CORESET information may be configured, and the 9 CORESET information may be divided into three groups of CORESET information. Each group includes three CORESET information. A first group may be CORESET1, CORESET2, CORESET3; a second group may be CORESET1*a*, CORESET2*a*, CORESET3*a*; and a third group may be CORESET1*b*, CORESET2*b*, CORESET3*b*. The CORESET information in the three groups may be switched.

The CORESET information of different groups in the embodiment may be valid in different first time-domain resources. The first time-domain resource may be a time point. For example, the first group may be valid at a time point T1, the second group may be valid at a time point T2, and the third group may be valid at a time point T3. A relationship among the different groups may be a displacement relationship in the frequency-domain. However, other relationships may be available. For example, the relationship may be a change in both the time-domain resources and the frequency-domain resources. At a determined time moment, only one group of CORESET information may be valid. For example, when first CORESET information included in the search space configured for the terminal device is CORESET1, the terminal may determine, based on the CORESET1 and the first time-domain resource, the second CORESET information corresponding to the time-domain resource as the CORESET1*a* or the CORESET1*b*. That is, the CORESET1 may be switched into the CORESET1*a* or the CORESET1*b*.

Alternatively, switching between the three groups of CORESET information in the embodiment may be performed based on a predefined rule, such as based on a rule prescribed by the terminal and the server, or based on a signaling instruction. For example, the terminal may receive instruction information sent by the network device, and the instruction information is configured to instruct switching of the CORESET information.

To be noted that the above-mentioned BWP in the present embodiment may be a public BWP or a terminal-specific BWP.

In the present embodiment, a plurality of CORESET information may be configured on the same BWP, and different CORESET information may be valid on different first time-domain resources. In this way, the terminal may determine the at least one second CORESET information corresponding to the time-domain resource based on the at least one first CORESET information and the first time-domain resource. Therefore, the terminal operating with the narrowband may be adapted, and frequency hopping of the PDCCH in various frequency-domain narrow bands may be supported, such that the reception performance of the PDCCH may be improved.

In an implementation, at least one first CORESET information and at least one second CORESET information belong to a same search space.

In the art, each search space is configured with only one CORESET information. In the present embodiment, at least one first CORESET information and at least one second CORESET information may belong to the same search space. That is, the plurality of CORESET information in the present embodiment may be switched in the same search space. Each search space may be configured with the plurality of CORESET information, which may be configured to configure a plurality of CORESET positions corresponding to the search space.

Alternatively, signaling of the search space in the present embodiment may be as follows:
SearchSpace::=SEQUENCE {
searchSpaceId SearchSpaceId,
controlResourceSetToAddModList SEQUENCE(SIZE (1 . . . 3)) OF ControlResourceSet,
controlResourceSetToReleaseList SEQUENCE(SIZE (1 . . . 3)) OF ControlResourceSetId}

Each search space in the present embodiment may be configured with one CORESET information list. The CORESET information list may include a plurality of CORESET information. For example, the CORESET information listed associated with each search space may include three CORESET information. One CORESET information of the plurality of CORESET information may be valid at each of various time points.

In an implementation, the first resource may include the first time-domain resource. In the operation S104, in case that the terminal determines the at least one second CORESET information corresponding to the first time-domain resource based on the at least one first CORESET information and the first time-domain resource, the first time-domain resource may be PDCCH monitoring time-domain resource information included in the search space. At least one of the at least one first CORESET information and at least one of the at least one second CORESET information may be different.

In the present embodiment, the terminal may determine the at least one second CORESET information corresponding to the first time-domain resource based on the at least one first CORESET information and the first time-domain resource in the same search space. That is, the plurality of CORESET information in the same search space may be switched. At this moment, the first time-domain resource may be the PDCCH monitoring time-domain resource information included in the search space. The PDCCH monitoring time-domain resource information may be PDCCH monitoring timing. In the monitoring timing, the terminal may detect the PDCCH based on at least one valid second CORESET information. For a terminal, in case that the search space is configured on the network device, the above-mentioned PDCCH monitoring timing may be configured in the search space.

In the present embodiment, in the same search space, at least one of the at least one first CORESET information may be different from at least one of the at least one second CORESET information. The at least one first CORESET information may change with time. The second CORESET information may be obtained from the first CORESET information based on the first time-domain resource, and the second CORESET information may be different from the first CORESET information.

In the present embodiment, different CORESET information in the same search space may be valid in different first time-domain resources. The plurality of CORESET information in the same search space may be switched to support the terminal having the low bandwidth capability to access the network.

In an implementation, the terminal receiving the at least one CORESET information includes: the terminal obtaining the at least one first CORESET information through configuration information of the search space.

In the present embodiment, the at least one first CORESET information may be obtained through the configuration information of the search space. The configuration information of the search space may be a time slot corresponding to the PDCCH monitoring timing configured by the search space. Different monitoring timings correspond to different first CORESET information.

Figure 3:
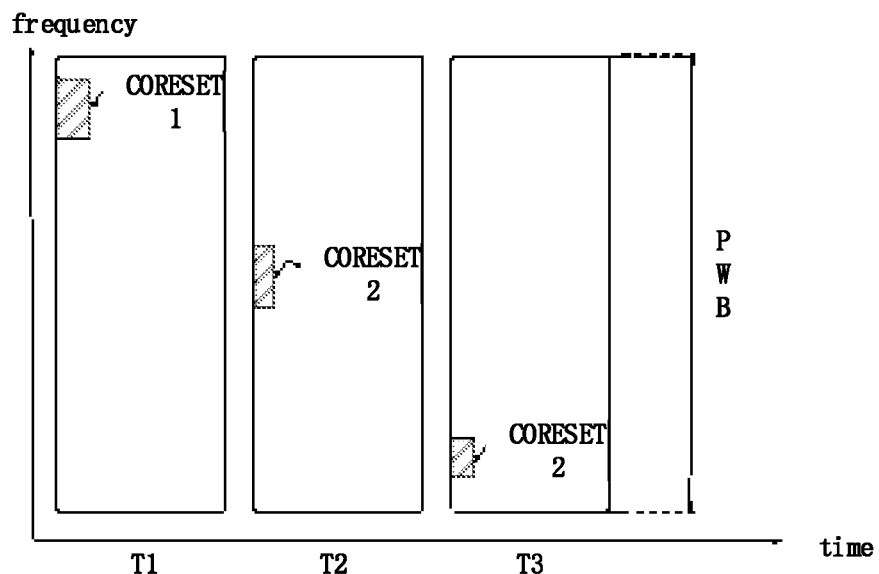
FIG. 3 is a schematic view of determining CORESET information through search space configuration information according to an embodiment of the present disclosure.

FIG. 3 is a schematic view of determining CORESET information through search space configuration information according to an embodiment of the present disclosure. As shown in FIG. 3, in the same search space, T1, T2 and T3 may be time slots corresponding to the PDCCH monitoring timing configured in the search space. The terminal may determine the CORESET 1 in the T1, may determine the CORESET 2 in the T2, and may determine the CORESET 3 in the T3. The CORESET 1, the CORESET 2 and the CORESET 3 may be valid CORESETs. The terminal may detect the PDCCH based on the valid CORESETs.

Alternatively, in the present embodiment, the valid CORESET information in the same search space may be determined, and CORESET information switching may be performed based on the predefined rule. For example, CORESET information may be switched based on a rule agreed by the terminal and the server in advance. The terminal may also receive indication signaling sent by the network device, and the CORESET information switching may be achieved based on the indication information. In the embodiment, the plurality of CORESET information may be configured on one search space, and various CORESET information are valid in various first time-domain resources, such that CORESET information switching may be achieved, adapting to narrowband operation of the UE, and supporting PDCCH for frequency hopping in various frequency-domain narrowbands. In this way, the reception performance of the PDCCH may be improved.

In an implementation, the first resource may include a first frequency-domain sub-band and a second frequency-domain sub-band. The at least one first CORESET information may correspond to the first frequency-domain sub-band, and the at least one second CORESET information may correspond to the second frequency-domain sub-band. The first frequency-domain sub-band and the second frequency-domain sub-band may belong to a same BWP or different BWPs.

In the LTE machine-to-machine communication (LTEMTC), in order to adapt to transmission of terminals having low bandwidth capabilities, the carrier bandwidth may be divided into a plurality of frequency-domain sub-bands based on predefined rules. The frequency-domain sub-band is also called a narrowband (narrowband). Each narrowband may include 6 consecutive PRBs. Each narrowband may have a serial number. In scheduling of the PDSCH and physical uplink shared channel (PUSCH) transmission, serial numbers of the narrowbands of PDSCH and PUSCH for reception and transmission may be indicated in the DCI. However, in the present embodiment, for the CORESET information configured for each BWP or the carrier bandwidth, the networks have correspondence with the frequency-domain sub-band on the BWP or the carrier bandwidth. Each frequency-domain sub-band may correspond to one configured CORESET information. The terminal may determine the at least one second CORESET information corresponding to the first frequency-domain resource based on the at least one first CORESET information and the first frequency-domain resource. The first frequency-domain resource may be the first frequency-domain sub-band (narrowband) corresponding to the at least one first CORESET information. That is, the at least one first CORESET information has a correspondence relationship with the first frequency-domain sub-band. Alternatively, the at least one second CORESET information obtained in the present embodiment has a correspondence relationship with the second frequency-domain sub-band, and therefore, switching of the CORESET information may performed along with various frequency-domain sub-bands. That is, based on the correspondence relationship between the CORESET information and the frequency-domain sub-band, the CORESET information may be determined by determining the frequency-domain sub-band. Different frequency-domain sub-bands may belong to the same BWP or to different BWPs.

Figure 4:
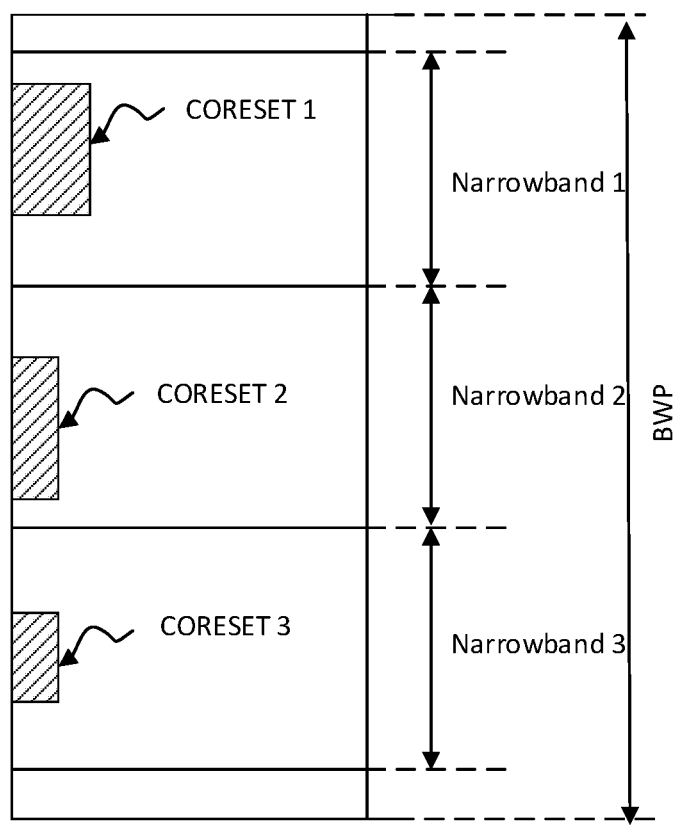
FIG. 4 is a schematic view of correspondence between CORESET information and a frequency-domain sub-band according to an embodiment of the present disclosure.

FIG. 4 is a schematic view of correspondence between CORESET information and a frequency-domain sub-band according to an embodiment of the present disclosure. As shown in FIG. 4, the BWP configuration may include three CORESET information, that is, the CORESET1, the CORESET2, and the CORESET3. The BWP may be divided into three frequency-domain sub-bands, named as narrowband 1, narrowband 2, and narrowband 3, based on the predefined rules. Based on the correspondence between CORESET information and frequency-domain sub-band, the CORESET1 corresponds to the narrowband 1, the CORESET2 corresponds to the narrowband 2, and the CORESET3 corresponds to the narrowband 3. Alternatively, when switching occurs on a frequency-domain sub-band related to the PDCCH, the corresponding CORESET information may also be switched correspondingly.

In an implementation, the at least one of the at least one first CORESET information may be different from at least one of the at least one second CORESET information.

In the present embodiment, when the switching of CORESET information may be performed along with various frequency-domain sub-bands, at least one of the at least one first CORESET information and at least one of the at least one second CORESET information may be different. The at least one first CORESET information may change with time. The second CORESET information may be obtained from the first CORESET information based on the first time-domain resource, and the second CORESET information may be different from the first CORESET information.

In an implementation, a relative time-domain resource or a relative frequency-domain resource of at least one of the at least one first CORESET information in the first frequency-domain sub-band may be the same as a relative time-domain resource or a relative frequency-domain resource of at least one of the at least one second CORESET information in the second frequency-domain sub-band.

In the present embodiment, the relative time-domain resource or the relative frequency-domain resource of at least one of the at least one first CORESET information in the first frequency-domain sub-band may be fixed. In case that at least one of the at least one first CORESET information is switched to the at least one second CORESET information, the relative time-domain resource or the relative frequency-domain resource of at least one of the at least one second CORESET information in the second frequency-domain sub-band may be the same as the relative time-domain resource or the relative frequency-domain resource of at least one of the at least one first CORESET information in the first frequency-domain sub-band. In this way, narrowband transmission of terminals having low bandwidth capabilities may be adapted.

Alternatively, in the present embodiment, the network device may further configure only one CORESET information for each BWP. A location of a physical resource block (PRB) of the CORESET information is a relative frequency-domain location within one frequency-domain sub-band. When a frequency-domain sub-band includes N PRBs, PRB locations of the CORESET information may be relative frequency-domain locations of the N PRBs within the frequency-domain sub-band. When the frequency-domain sub-band is switched, a frequency-domain resource of the corresponding CORESET information may be determined based on the relative frequency-domain location of the CORESET information in the frequency-domain sub-band. The relative frequency-domain location of the frequency-domain resource of the CORESET information in the frequency-domain sub-band may be fixed.

In an implementation, the terminal may determine the first frequency-domain sub-band or the second frequency-domain sub-band through indication information or a predefined rule.

In the present embodiment, the terminal may obtain the indication information transmitted from the network device. Based on the indication information, the terminal may determine the first frequency-domain sub-band corresponding to the at least one first CORESET information or the second frequency-domain sub-band corresponding to the at least one second CORESET information. Alternatively, the terminal may determine the above-mentioned first frequency-domain sub-band or the above-mentioned second frequency-domain sub-band based on the rule predefined by the server and the terminal.

In the present embodiment, the correspondence between the CORESET information and the frequency-domain sub-band may be defined, the corresponding CORESET information may be determined based on switching of frequency-domain sub-band. In this way, compared to a situation that the at least one first CORESET information belongs to the same BWP, and/or the at least one second CORESET information belongs to the same BWP, and the at least one first CORESET information and the at least one second CORESET information belong to the same search space, technical solutions of the present embodiment may avoid controlling of separate switching of the CORESET information, and may reduce complexity. At the same time, narrowband operation of terminals having low bandwidth capabilities may be adapted, PDCCH switching in different frequency-domain sub-bands may be supported, and congress improves the reception performance of the PDCCH.

In an implementation, the at least one piece of first CORESET information belongs to a first search space, and the at least one piece of second CORESET information belongs to a second search space.

In the present embodiment, configuration information of the first search space may include the at least one first CORESET information, and configuration information of the second search space may include the at least one second CORESET information. The first search space and the second search space may be different or the same. As described in the above, the at least one first CORESET information and the at least one second CORESET information may belong to the same search space.

In the present embodiment, the terminal can perform detection on the PDCCH on the corresponding time-frequency resource, based on the search space indicated by the network device. Configuration information of the first search space or the second search space may include following information: a search space ID; controlResourceSetID, which is an ID configured to indicate a control resource set and to configure the time-frequency resource for the PDCCH search space; and a period of a monitoring slot and a shift within the period. The period may include 1 slot, 2 slots, 4 slots, 5 slots, 8 slots, 10 slots, 16 slots, 20 slots, 40 slots, 80 slots, 160 slots, 320 slots, 640 slots, 1280 slots, or 2560 slots. Duration is configured to indicate the number of consecutive monitoring slots within a PDCCH search space period. monitoringSymbolsWithinSlot may be configured to indicate on which symbol within the PDCCH monitoring slot the PDCCH monitoring is performed. PDCCH candidates may be configured to indicate configuration information of the PDCCH candidates.

In an implementation, the first search space may be a common search space or a terminal-specific search space. The second search space may be the common search space or the terminal-specific search space.

In the present embodiment, the first search space may be in a common type or in a UE-specific type, and the second search space may be in the common type or in the UE-specific type.

To be noted that the above method of the present embodiment is also applicable to public CORESET information. The public configuration information of the PDCCH may include a plurality of public CORESET information and search space configuration, as shown below, including receiving SIB1, other system information (OSI), a paging message, and a search page of a random access response (RAR): controlResourceSetZero ControlResourceSetZero; commonControlResourceSet ControlResourceSet; searchSpaceZero SearchSpaceZero; commonSearchSpaceListSEQUENCE(SIZE(1 . . . 4)) OF SearchSpace; searchSpaceSIB1 SearchSpaceId searchSpaceOtherSystemInformation SearchSpaceId; pagingSearchSpace SearchSpaceId; ra-SearchSpace SearchSpaceId.

Alternatively, in the present embodiment, an initial BWP may be configured for a receiving common channel and a sending common channel of a terminal in the initial access state and in an idle state. The initial BWP may be shown as follows:

```
DownlinkConfigCommon ::= SEQUENCE {
frequencyInfoDL FrequencyInfoDL OPTIONAL, -- Cond InterFreqHOAndServCellAdd
initialDownlinkBWP BWP-DownlinkCommon OPTIONAL, -- Cond ServCellAdd
...
}
UplinkConfigCommon ::= SEQUENCE {
frequencyInfoUL FrequencyInfoUL OPTIONAL, -- Cond InterFreqHOAndServCellAdd
initialUplinkBWP BWP-UplinkCommon OPTIONAL, -- Cond ServCellAdd
dummy TimeAlignmentTimer
}
```

Correspondingly, the present embodiment may also be applied for the initial BWP configured by the network device, the common search space, and the terminal-specific search space, and the terminal may determine at least one second CORESET information corresponding to the first resource based on at least one first CORESET information and the first resource.

Further, for the first frequency-domain sub-band corresponding to the at least one first CORESET information and the second frequency-domain sub-band corresponding to the at least one second CORESET information, the first frequency-domain sub-band and the second frequency-domain sub-band may belong to the same or different BWPs. Since a bandwidth of the initial BWP may be relatively narrow, a plurality of initial BWPs may be configured. By switching the initial BWP, the corresponding CORESET information may be switched. The initial BWP may be divided into a plurality of frequency-domain sub-bands, and the CORESET information may be determined by determining the frequency-domain sub-band and based on correspondence between the CORESET information and the frequency-domain sub-bands.

Figure 5:
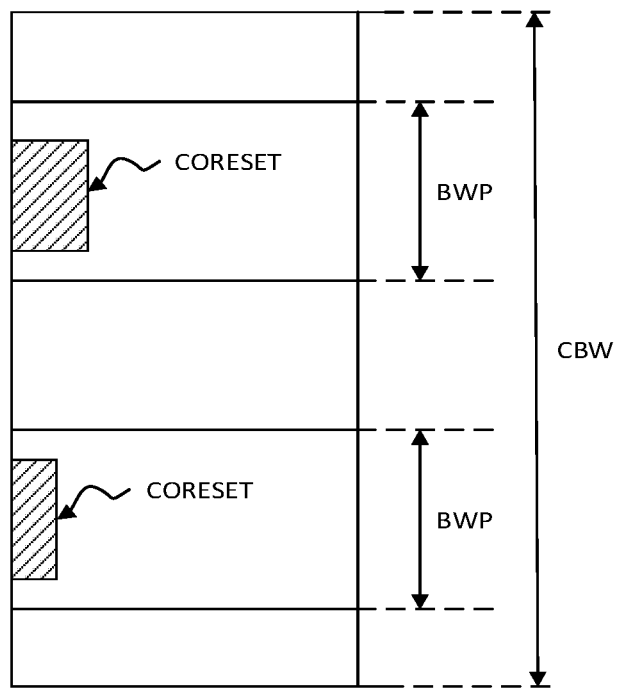
FIG. 5 is a schematic view of a relationship between CORESET information and BWP in the art.

In the art, the CORESET information may be used as shown in FIG. 5. FIG. 5 is a schematic view of a relationship between CORESET information and BWP in the art. Within one cell bandwidth (CBW), a plurality of BWPs may be included. Unlike the CORESET information, which can be switched, as shown in the present disclosure, each BWP may be configured with a plurality of fixed CORESET information.

Specific configuration of the CORESET information is given in the RRC signaling, shown as follows:

```
ControlResourceSet information element
ControlResourceSet ::= SEQUENCE {
controlResourceSetId ControlResourceSetId,
frequencyDomainResources BIT STRING (SIZE (45)),
duration INTEGER (1..maxCoReSetDuration),
cce-REG-MappingType CHOICE {
```

-continued

```
interleaved SEQUENCE {
reg-BundleSize ENUMERATED {n2, n3, n6},
interleaverSize ENUMERATED {n2, n3, n6},
shiftIndex INTEGER(0..maxNrofPhysicalResourceBlocks-1) OPTIONAL -- Need S
},
nonInterleaved NULL
},
precoderGranularity ENUMERATED {sameAsREG-bundle, allContiguousRBs},
tci-StatesPDCCH-ToAddList SEQUENCE(SIZE (1..maxNrofTCI-StatesPDCCH)) OF
TCI-StateId OPTIONAL, - Cond NotSIB1-initialBWP
tci-StatesPDCCH-ToReleaseList SEQUENCE(SIZE (L.maxNrofTCI-StatesPDCCH))
OF TCI-StateId OPTIONAL, - Cond NotSIB1-initialBWP
tci-PresentInDCI ENUMERATED {enabled} OPTIONAL, -- Need S
pdcch-DMRS-ScramblingID INTEGER (0..65535) OPTIONAL, -- Need S
...
}
-- TAG-CONTROLRESOURCESET-STOP
-- ASN1STOP
```

Meanings of major information domains are shown in the following. The ControlResourceSetId may be configured to indicate a serial number of the CORESET, ranging from 1 to 11. CORESET 0 may be configured to indicate CORESET indicated in a broadcast message. The frequencyDomain-Resources may be configured to indicate CORESET frequency-domain resources, indicating resource blocks (RB) included in the CORESET. The duration may be configured to indicate the number of consecutive symbols of the CORESET. A value of the duration may be taken from a set of {1,2,3}. The cce-REG-MappingType may be configured as an interleaved mapping or a non-interleaved mapping. The precoderGranularity may be configured to indicate whether precoding granularity of the DMRS is wideband precoding or narrowband precoding. However, in the above search space configuration of the PDCCH, the configuration of the CORESET information does not consider the narrowband supported by the terminal having the low bandwidth capability. In addition, in the LTE MTC system, in order to reduce a receiving bandwidth of the terminal and reduce costs and complexity, a MTC PDCCH is introduced, and resources carrying the MPDCCH may include maximum of 6 PRBs in the frequency-domain. At the same time, after reducing a bandwidth of the frequency-domain carrying the MPDCCH, in order to improve transmission reliability and the coverage of the control channel, frequency hopping and repetition may be introduced into transmission of the MPDCCH. The frequency hopping may improve transmission performance through frequency diversity, and the repetition may enable the terminal to combine a plurality of transmissions of the MPDCCH, such that the reception performance of the PDCCH may be improved.

Figure 6:
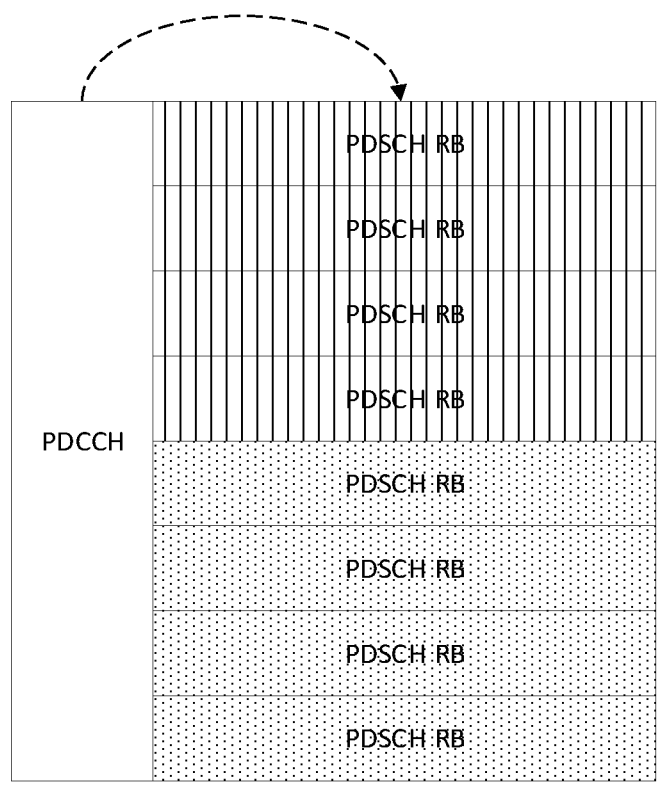
FIG. 6 is a schematic view of PDSCH scheduled for PDCCH in the art.

The MPDCCH may be similar to an Enhanced Physical Downlink Control Channel (EPDCCH) in the LTE. The PDSCH and resources occupied by the MPDCCH may be frequency division multiplexed. As shown in FIG. 6, FIG. 6 is a schematic view of PDSCH scheduled for PDCCH in the art. The PDCCH may be in a control region, in several symbols in front of a subframe. FIG. 7 is a schematic view of an MPDCCH supporting repetition in a plurality of subframes according to an embodiment of the present disclosure. As shown in FIG. 7, frequency hopping may be achieved among the MPDCCHs of different subframes. That is, the MPDCCHs of different subframes may be in different frequency-domain sub-bands. The MPDCCH and the PDSCH scheduled by the MPDCCH may not be in the same frequency-domain sub-band, and the DCI carried in the MPDCCH may indicate the frequency-domain sub-band where the PDSCH is located.

In the art, a frequency point of the 5G may include two parts: FR1 (f<6 GHz, low frequency) and FR2 (f>6 GHz, high frequency, millimeter wave). A bandwidth of the FR1 may be 5 MHz, 10 MHz, 15 MHz, 20 MHz, 25 MHz, 30 MHz, 40 MHz, 50 MHz, 60 MHz, 80 MHz and 100 MHz. A bandwidth of the FR2 may be 50 MHz, 100 MHz, 200 MHz and 400 MHz and so on. In order to enable the terminal to support access to the network on a 5G frequency band, for FR1, a bandwidth of the terminal may need to support 100 MHz. Correspondingly, for a FR2 frequency band, a bandwidth of the terminal may need to support 400 MHz.

In the new radio system (NR), it is desired that technologies similar to the above description may be introduced to use the NR to better support various types of services other than the Enhanced Mobile Broadband (eMBB) service. For a NR-light system, the terminal that supports the low bandwidth capability may have reduced power consumption and reduced costs. However, the NR system in the art does not specifically consider allowing the terminal having the low bandwidth capability to access the network. For example, in the search space configuration of the PDCCH, configuration of the CORESET information does not consider the narrowband supported by the terminal having the low bandwidth capability. Therefore, frequency hopping and repetition of the PDCCH resources cannot be supported, and the reception performance of the PDCCH cannot be improved.

In the present embodiment, at least one first CORESET information belongs to the same BWP; and/or at least one second CORESET information belongs to the same BWP; at least one first CORESET information and at least one second CORESET information belong to the same search space; at least one first CORESET information corresponds to the first frequency-domain sub-band; at least one second CORESET information corresponds to the second frequency-domain sub-band; the first frequency-domain sub-band and the second frequency-domain sub-band belong to the same or different BWPs. In this way, the CORESET information may be switched, and such that the terminal may receive the PDCCH based on the at least one second CORESET information. Therefore, the narrowband operation of the terminal having the low bandwidth capability may be adapted, and transmission of the PDCCH may be adapted to various frequency-domain narrowbands, such that the reception performance of the PDCCH may be improved.

The method for determining the control channel in the present disclosure will be described below from the network side. To be noted that the method for determining the control channel of the network side in the present embodiment corresponds to the method for determining the control channel of the terminal side described above. FIG. 8 is a flow chart of another method for determining a control channel according to an embodiment of the present disclosure. As shown in FIG. 8, the method may include following operations.

In an operation S802, the network device may send at least one first CORESET information. The at least one first CORESET information and the first resource are configured to enable the terminal to determine at least one second CORESET information corresponding to the first resource.

In an operation S804, the network device may send the PDCCH. The at least one second CORESET information is configured to enable the terminal to receive the PDCCH.

In an implementation, the at least one first CORESET information belongs to the same BWP, and/or the at least one second CORESET information belongs to the same BWP.

In an implementation, the first resource may include the first time-domain resource. In case that the at least one first CORESET information and the first time-domain resource are configured to enable the terminal to determine the at least one second CORESET information corresponding to the first time-domain resource, at least one of the at least one first CORESET information may be different from at least one of the at least one second CORESET information. In an implementation, for the operation S804, the network device sending the at least one first CORESET information includes: the network device sending the at least one first CORESET information through the configuration information of the BWP.

In an implementation, the at least one CORESET information and the at least one second CORESET information belong to the same search space. In an implementation, the first resource may include the first time-domain resource. In case that the at least one first CORESET information and the first time-domain resource are configured to enable the terminal to determine the at least one second CORESET information corresponding to the first time-domain resource, the first time-domain resource may be the PDCCH monitoring time-domain resource information included in the search space, and the at least one of the at least one first CORESET information may be different from at least one of the at least one second CORESET information. In an implementation, for the operation S804, the network device sending the at least one first CORESET information includes: the network device sending the at least one first CORESET information through the configuration information of the search space.

In an implementation, the first resource may include the first frequency-domain sub-band and the second frequency-domain sub-band. The at least one first CORESET information may correspond to the first frequency-domain sub-band, and the at least one second CORESET information may correspond to the second frequency-domain sub-band. The first frequency-domain sub-band and the second frequency-domain sub-band may belong to the same BWP or different BWPs. In an implementation, at least one of the at least one first CORESET information may be different from at least one of the at least one second CORESET information. In an implementation, the relative time-domain resource or the relative frequency-domain resource of at least one of the at least one first CORESET information in the first frequency-domain sub-band may be the same as the relative time-domain resource or the relative frequency-domain resource of at least one of the at least one second CORESET information in the second frequency-domain sub-band. In an implementation, the network device may send the indication information. The indication message may be configured to enable the terminal to determine the first frequency-domain sub-band or the second frequency-domain sub-band. In an implementation, the first frequency-domain sub-band or the second frequency-domain sub-band may be determined by the terminal by the predefined rule.

In an implementation, the at least one first CORESET information may belong to the first search space, and the at least one second CORESET information may belong to the second search space. In an implementation, the first search space may be the common search space or the terminal-specific search space, and the second search space may be the common search space or the terminal-specific search space.

According to the above description, any ordinary skilled person in the art shall understand that the methods according to the above embodiments can be implemented by means of software and necessary common hardware platforms, or by means of hardware. However, in many cases, the former may be a better way of implementation. In this way, the essential part of the technical solution of the present disclosure or a part of the technical solution of the present disclosure contributing to the art may be embodied in a form of a software product. The software product may be stored in a storage medium (such as a ROM/a RAM, a disk, a CD-ROM) and may include a number of instructions to enable a terminal device (which may be a mobile phone, a computer, a server, or a network device, and so on) to execute the methods in various embodiments of the present disclosure.

Embodiments of the present disclosure further provide a new radio system. To be noted that the new radio system of the present embodiment may be configured to perform the method of determining the control channel as shown in FIG. 1 or FIG. 2. FIG. 9 is a schematic view of a new radio system according to an embodiment of the present disclosure. As shown in FIG. 9, the new radio system 90 may include: a network device 91 and a terminal 92.

The network device 91 may be configured to send at least one first CORESET information. The terminal 92 may be configured to receive the at least one first CORESET information, and to determine at least one second CORESET information corresponding to the first resource based on the at least one first CORESET information and the first resource. The network device 91 may send the PDCCH, and the terminal 92 may receive the PDCCH based on the at least one second CORESET information.

In the present embodiment, the NR system may be mainly configured to support eMBB services. Main technologies of the NR system are configured to meet demands of a high speed, a high spectrum efficiency, and a large bandwidth. In fact, in addition to the eMBB services, many other types of services are present, such as sensor networks, video surveillance, wearables, and so on. These types of services and the eMBB services may have different requirements in terms of rates, bandwidths, power consumption, and costs. A capability of a terminal that supports these services may be reduced compared to that of a terminal that supports the eMBB services. For example, the terminal that supports these services may support a reduced bandwidth, have relaxed processing time, and have the reduced number of antennas. The NR system needs to be optimized for these services and the corresponding low-bandwidth capabilities. The optimized system is called an NR-light system. In LTE, similar systems, such as the MTC and the cellular-based narrowband Internet of things (NB-IoT), are designed to support terminals having a large number of connections, low power consumption, and low costs. In the NR system, it is desired to introduce similar technologies to allow the NR to better support other types of services in addition to the eMBB services. In the new radio system of the present embodiment, the terminal determines the at least one second CORESET information corresponding to the first resource based on the at least one first CORESET information and the first resource sent from the network device. Further, the terminal receives the PDCCH based on the at least one second CORESET information. In this way, the terminal that has the low bandwidth capability accessing the network may be adapted, and the frequency hopping and repetition of the PDCCH resources may be supported. Technical effect of improving the reception performance of the PDCCH may be achieved, and therefore, the technical problem that the reception performance of the PDCCH cannot be improved may be solved.

Embodiments of the present disclosure further provide an apparatus for determining the control channel. To be noted that the apparatus for determining the control channel of the present embodiment may be configured to perform the method of determining the control channel shown in FIG. 1 or FIG. 2. Those operations that are already described will not be repeated hereinafter.

Figure 10:
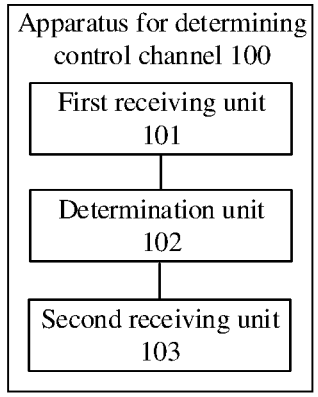
FIG. 10 is a schematic view of a device for determining a control channel according to an embodiment of the present disclosure.

FIG. 10 is a schematic view of a device for determining a control channel according to an embodiment of the present disclosure. As shown in FIG. 10, the apparatus 100 for determining the control channel may include: a first receiving unit 101, a determination unit 102 and a second receiving unit 103, which are configured in the terminal. The first receiving unit 101 may be configured to receive at least one first CORESET information. The determination unit 102 may be configured to determine, based on the at least one first CORESET information and the first resource, at least one second CORESET information corresponding to the first time-domain resource or the first frequency-domain resource. The second receiving unit 103 may be configured to receive, based on the at least one second CORESET information, the PDCCH.

Alternatively, the at least one first CORESET information belongs to the same BWP, and/or, the at least one second CORESET information belongs to the same BWP. Alternatively, the first resource may include the first time-domain resource. In case that the determination unit is configured to determine the at least one second CORESET information corresponding to the first time-domain resource based on the at least one first CORESET information and the first time-domain resource, at least one of the at least one first CORESET information may be different from at least one of the at least one second CORESET information. Alternatively, the first receiving unit may include: a first receiving module, configured to obtain the at least one first CORESET information through the configuration information of the BWP.

Alternatively, the at least one first CORESET information and the at least one second CORESET information may belong to the same search space. Alternatively, the first resource may include the first time-domain resource. In case that the determination unit is configured to determine the at least one second CORESET information corresponding to the first time-domain resource based on the at least one first CORESET information and the first time-domain resource, the first time-domain resource may be the PDCCH monitoring time-domain resource information included in the search space, and at least one of the at least one first CORESET information may be different from at least one of the at least one second CORESET information. Alternatively, the first receiving unit may include: a second receiving module, configured to obtain the at least one first CORESET information through the configuration information of the search space.

Alternatively, the first resource may include the first frequency-domain sub-band and the second frequency-domain sub-band. The at least one first CORESET information may correspond to the first frequency-domain sub-band, and the at least one second CORESET information may correspond to the second frequency-domain sub-band. The first frequency-domain sub-band and the second frequency-domain sub-band may belong to the same BWP or different BWPs. Alternatively, at least one of the at least one first CORESET information may be different from at least one of the at least one second CORESET information. Alternatively, the relative time-domain resource or the relative frequency-domain resource of at least one of the at least one first CORESET information in the first frequency-domain sub-band may be the same as the relative time-domain resource or the relative frequency-domain resource of at least one of the at least one second CORESET information in the second frequency-domain sub-band. Alternatively, the terminal may determine the first frequency-domain sub-band or the second frequency-domain sub-band based on the indication information or the predefined rule.

Alternatively, the at least one first CORESET information may belong to the first search space, and the at least one second CORESET information may belong to the second search space. Alternatively, the first search space may be the common search space or the terminal-specific search space, and the second search space may be the common public search space or the terminal-specific search space.

Figure 11:
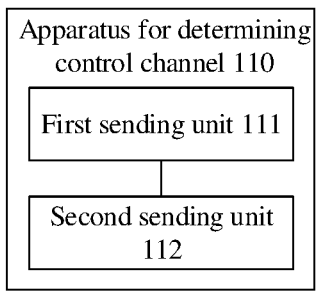
FIG. 11 is a schematic view of another device for determining a control channel according to an embodiment of the present disclosure.

FIG. 11 is a schematic view of another device for determining a control channel according to an embodiment of the present disclosure. As shown in FIG. 11, an apparatus 110 for determining the control channel may include: a first sending unit 111 and a second sending unit 112, which are configured in the network device. The first sending unit 111 may be configured to send at least one first CORESET information. The at least one first CORESET information and the first resource may be configured to enable the terminal to determine at least one second CORESET information corresponding to the first resource. The second sending unit 112 may be configured to send the PDCCH. The at least one second CORESET information is configured to enable the terminal to receive the PDCCH.

Alternatively, the at least one first CORESET information may belong to the same BWP, and/or the at least one second CORESET information may belong to the same BWP. Alternatively, the first resource may include the first time-domain resource. In case that the at least one first CORESET information and the first time-domain resource are configured to enable the terminal to determine the at least one second CORESET information corresponding to the first time-domain resource, at least one of the at least one first CORESET information may be different from at least one of the at least one second CORESET information. Alternatively, the first sending unit may include: a first sending module, configured to send the at least one first CORESET information through the configuration information of the BWP.

Alternatively, the at least one first CORESET information and the at least one second CORESET information may belong to the same search space. Alternatively, the first resource may include the first time-domain resource. In case that the at least one first CORESET message and the first time-domain resource are configured to enable the terminal to determine the at least one second CORESET information corresponding to the first time-domain resource, the first time-domain resource may be the PDCCH monitoring time-domain resource information included in the search space, and at least one of the at least one first CORESET information may be different from at least one of the at least one second CORESET information. Alternatively, the first sending unit may include: a second sending module, configured to send the at least one first CORESET information through the configuration information of the search space.

Alternatively, the first resource may include the first frequency-domain sub-band and the second frequency-domain sub-band. The at least one first CORESET information may correspond to the first frequency-domain sub-band, and the at least one second CORESET information may correspond to the second frequency-domain sub-band. The first frequency-domain sub-band and the second frequency-domain sub-band may belong to the same BWP or different BWPs. Alternatively, at least one of the at least one first CORESET information may be different from at least one of the at least one second CORESET information. Alternatively, the relative time-domain resource or the relative frequency-domain resource of at least one of the at least one first CORESET information in the first frequency-domain sub-band may be the same as the relative time-domain resource or the relative frequency-domain resource of at least one of the at least one second CORESET information in the second frequency-domain sub-band. Alternatively, the apparatus may further include a third sending unit, configured to send indication information. The indication information may be configured to enable the terminal to determine the first frequency-domain sub-band or the second frequency-domain sub-band. Alternatively, the first frequency-domain sub-band or the second frequency-domain sub-band may be determined by the terminal based on the predefined rule.

Alternatively, the at least one first CORESET information may belong to the first search space, and the at least one second CORESET information may belong to the second search space. Alternatively, the first search space may be the common search space or the terminal-specific search space, and the second search space may be the common public search space or the terminal-specific search space.

To be noted that the above-mentioned units and modules may be implemented in terms of software or hardware. When the units and modules are implemented in terms of the hardware, the units and modules may be implemented by means of, but not limited to, the following: the above-mentioned units and modules may be located in a same processor; or the above-mentioned modules may be combined in any manner and are located in various processors.

Figure 12:
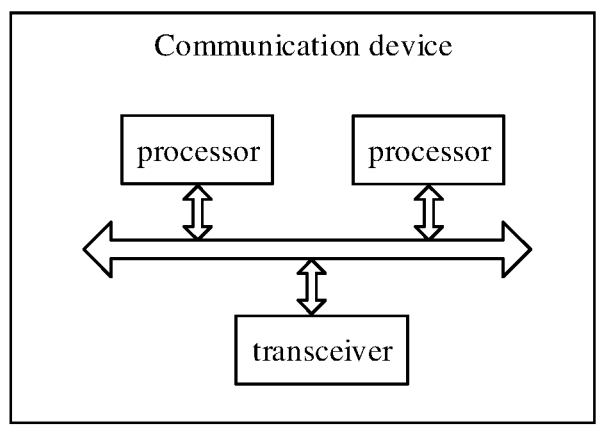
FIG. 12 is a schematic structural diagram of a communication device according to an embodiment of the present disclosure.

FIG. 12 is a schematic structural diagram of a communication device according to an embodiment of the present disclosure. As shown in FIG. 12, the communication device may include a processor. The processor may invoke and run a computer program from a memory to implement the method in embodiments of the present disclosure. Alternatively, as shown in FIG. 12, the communication device may further include the memory. The processor may invoke and run the computer program from the memory to implement the method in embodiments of the present disclosure. The memory may be a device separated from the processor or may be integrated into the processor. Alternatively, as shown in FIG. 12, the communication device may further include a transceiver. The processor may control the transceiver to communicate with other devices. In detail, the transceiver may send information or data to other devices, or receive information or data from other devices. The transceiver may include a transmitter and a receiver. The transceiver may further include an antenna. The number of antennas may be one or more. Alternatively, the communication device may be the network device of the embodiments of the present disclosure. The communication device may perform the corresponding operations implemented by the network device in the methods of the various embodiment of the present disclosure, which will not be repeatedly described herein. Alternatively, the communication device may specifically be the mobile terminal/the terminal device of the embodiments of the present disclosure. The communication device may perform the corresponding operations implemented by the mobile terminal/the terminal device in the methods of the various embodiment of the present disclosure, which will not be repeatedly described herein.

Figure 13:
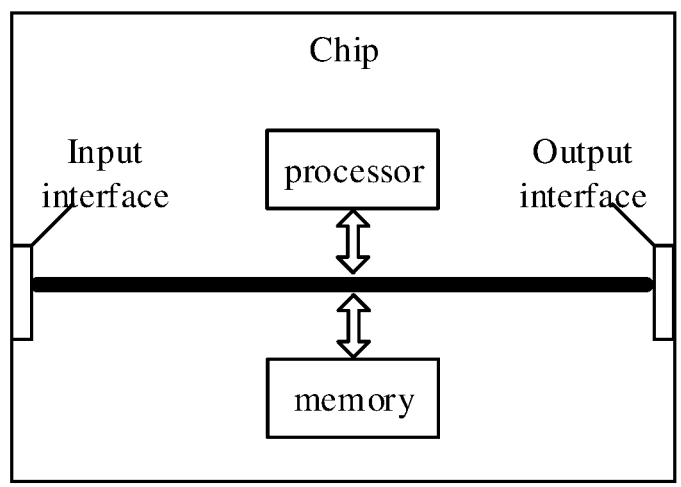
FIG. 13 is a schematic structural diagram of a chip according to an embodiment of the present structural.

FIG. 13 is a schematic structural diagram of a chip according to an embodiment of the present structural. As shown in FIG. 13, the chip may include a processor. The processor may invoke and run a computer program from a memory to implement the methods in the embodiments of the present disclosure. Alternatively, as shown in FIG. 13, the chip may further include the memory. The processor may invoke and run the computer program from the memory to implement the methods in the embodiments of the present disclosure. The memory may be a device separated from the processor or may be integrated in the processor. Alternatively, the chip may further include an input interface. The processor may control the input interface to communicate with other devices or chips. In detail, the processor may control the input interface to obtain information or data sent by other devices or chips. The chip may further include an output interface. The processor may control the output interface to communicate with other devices or the chip. In detail, the processor may control the output interface to output information or data to other devices or the chips. Alternatively, the chip may be applied to the network device in the embodiments of the present disclosure. The chip may perform the corresponding operations implemented by the network device in the methods of the various embodiment of the present disclosure, which will not be repeatedly described herein. Alternatively, the chip may be applied to the mobile terminal/the terminal device in the embodiments of the present disclosure. The chip may perform the corresponding operations implemented by the mobile terminal/the terminal device in the methods of the various embodiment of the present disclosure, which will not be repeatedly described herein. The chip described in embodiments of the present disclosure may also be referred to as a system-level chip, a systemic chip, a system-on-a-chip, and so on.

Figure 14:
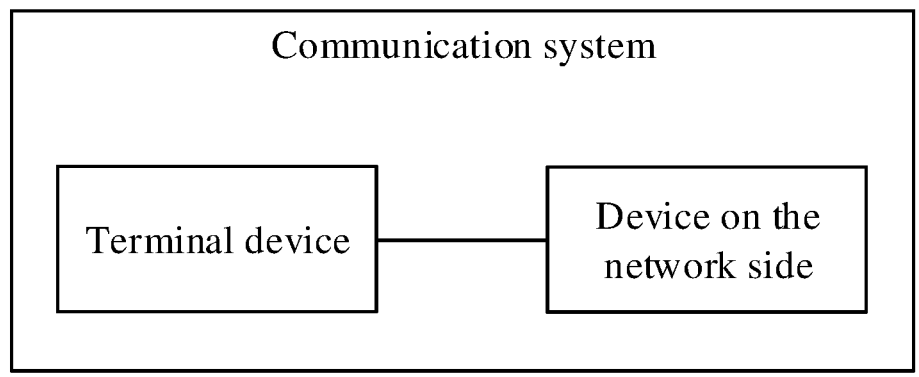
FIG. 14 is a structural block diagram of a communication system according to an embodiment of the present disclosure.

FIG. 14 is a structural block diagram of a communication system according to an embodiment of the present disclosure. As shown in FIG. 14, the communication system may include a terminal device and a network device. The terminal device may be configured to implement the corresponding functions implemented by the terminal device in the methods described above. Further, the network device may be configured to implement the corresponding functions implemented by the network device in the methods described above. Functions will not be repeatedly described hereinafter.

It shall be understood that the processor of the present disclosure may be an integrated circuit chip having signal processing capabilities. In implementations, the operations of the above method embodiments may be accomplished by an integrated logic circuit in the hardware in the processor or by instructions in the form of software. The processor as described above may be a general purpose processor, a Digital Signal Processor (DSP), an Application Specific Integrated Circuit (ASIC), a Field Programmable Gate Array (FPGA) or other programmable logic devices, discrete gate or transistor logic devices, discrete hardware components. The processor may implement or perform various methods, operations and logical block diagrams in embodiments of the present disclosure. The general purpose processor may be a microprocessor or any conventional processor, and so on. The operations of the methods disclosed in embodiments of the present disclosure may be performed by a hardware decoding processor or by a combination of hardware and software modules in the decoding processor. The software module may be located in a random memory, a flash memory, a read-only memory, a programmable read-only memory or an electrically erasable programmable memory, registers and other storage media that are well established in the art. The storage medium is located in the memory, and the processor reads information in the memory and completes the operations of the above methods through the hardware.

It shall be understood that the memory in embodiments of the present disclosure may be a volatile memory or a non-volatile memory, or may include both the volatile and the non-volatile memory. The non-volatile memory may be a Read-Only Memory (ROM), a Programmable ROM (PROM), an Erasable Programmable Read-Only Memory (EPROM), an Electrically Erasable Programmable Read-Only Memory (EPROM), or a flash memory. The volatile memory may be a Random Access Memory (RAM), configured as an external cache. To be exemplary, but not for limiting, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Memory Bus Random Access Memory (DR RAM). To be noted that, the memories of the systems and methods described herein are intended to include, but are not limited to, the above and any other suitable types of memories.

It shall be understood that the above memories are exemplary but are not limiting descriptions. For example, the memories in embodiments of the present disclosure may also be a static RAM (SRAM), a dynamic RAM (DRAM), a synchronous DRAM (SDRAM), a double data rate SDRAM (DDR SDRAM), an enhanced synchronous SDRAM (ESDRAM), a synchronous link DRAM (SDR SDRAM), and a Direct Rambus RAM (DR RAM), and so on. That is, the memories in embodiments of the present disclosure are intended to include, but are not limited to, the above and any other suitable types of memories.

Embodiments of the present disclosure further provide a computer readable storage medium for storing a computer program. Alternatively, the computer readable storage medium may be applied to the network device in the embodiments of the present disclosure, and the computer program causes the computer to perform the corresponding operations implemented by the network device in the various methods of the embodiments of the present disclosure, which will not be described herein. Alternatively, the computer readable storage medium may be configured in the mobile terminal/the terminal device in the embodiments of the present disclosure, and the computer program causes the computer to perform the corresponding operations implemented by the mobile terminal/the terminal device in the methods of the embodiments of the present disclosure, which will not be repeated herein.

Embodiments of the present disclosure further provide a computer program product including computer program instructions. Alternatively, the computer program product may be applied to the network device in the embodiments of the present disclosure, and the computer program instructions cause the computer to perform the corresponding operations implemented by the network device in the methods of the embodiments of the present disclosure, which will not be described herein for brevity. Alternatively, the computer program product may be applied to the mobile terminal/the terminal device in the embodiments of the present disclosure, and the computer program instructions cause the computer to perform the corresponding operations implemented by the mobile terminal/the terminal device in the methods of the embodiment of the present disclosure, which will not be repeated herein.

Embodiments of the present disclosure further provide a computer program. Alternatively, the computer program may be applied to the network device in the embodiments of the present disclosure. When the computer program is run on a computer, the computer program causes the computer to perform the corresponding operations implemented by the network device in the methods of the embodiments of the present disclosure, which will not be described herein. Alternatively, the computer program may be applied to the mobile terminal/the terminal device in the embodiments of the present disclosure. When the computer program is run on the computer, the computer program causes the computer to perform the corresponding operations implemented by the mobile terminal/the terminal device in the methods of the embodiments of the present disclosure, which will not be repeated herein.

Any ordinary skilled person in the art shall understand that the units and algorithmic operations of the various examples described in the embodiments of the present disclosure are capable of being implemented in electronic hardware, or a combination of computer software and electronic hardware. These functions being performed in hardware or software may be determined based on particular applications and design constraints of technical solutions. The skilled person may perform different methods to implement described functions for each particular application, but the implementations shall not be considered as falling out of the scope of the present disclosure. It will be clear to the skilled person in the art that, the specific working processes of the systems, the devices and the units described above may be referred to the corresponding processes in the method embodiments and will not be repeated here. In the various embodiments provided by the present disclosure, it shall be understood that the systems, the devices and the methods disclosed herein may be implemented in other ways. For example, the embodiments of the device described above are merely exemplary. For example, division of the units is only logical functional division, and the units can be divided in another way when actually implemented. For example, a plurality of units or components can be combined or can be integrated into another system, or some features can be omitted or not implemented. On another point, mutual coupling or direct coupling or communicative connection shown or discussed may be indirect coupling or indirect communicative connection through some interfaces, devices or units, which may be electrical, mechanical and the like.

The units illustrated as separates components may or may not be physically separated, and components displayed as units may or may not be physical units. That is, the components may be located in one place or may be distributed over a plurality of network units. Some or all of these units can be selected based on practical needs to achieve purposes of the present disclosure. Alternatively, individual functional units in the various embodiments of the present disclosure may be integrated in a single processing unit, or may be physically present separately. Alternatively, two or more units may be integrated in a single unit. The functions described may be stored in a computer readable storage medium when the functions are implemented in a form of a software functional unit and sold or used as a separate product. Therefore, essence of the technical solution of the present invention, or a part of the technical solution that contributes to the art, may be embodied in the form of the software product. The software product may be stored in a storage medium and may include a number of instructions to enable a computer device (which may be a personal computer, a server, or a network device, and so on) to perform all or some of the operations of the methods in the various embodiments of the present disclosure. The aforementioned storage medium includes a USB stick, a removable hard disk, a Read-Only Memory (ROM), a Random Access Memory (RAM), a magnetic disk, a CD-ROM, and other media that can store program codes.

The above description shows only embodiments of the present disclosure, but does not limit the scope of the present disclosure. Any variation or substitution performed by any skilled person in the art within the scope of the technology disclosed herein shall be covered by the scope of the present disclosure. The scope of the present disclosure shall therefore be governed by the claims.

What is claimed is:

1. A method for determining a control channel, comprising:
   receiving, by a terminal, at least one first control resource set (CORESET) information; and
   receiving, by the terminal, a physical downlink control channel (PDCCH) based on at least one second CORESET information, wherein the at least one second CORESET information is determined based on the at least one first CORESET information and a first resource, and the at least one second CORESET information corresponds to the first resource;
   wherein the first resource comprises a first time-domain resource, and correspondence between the at least one second CORESET information and the first resource comprises:
   the second CORESET information being valid on the first time-domain resource;
   wherein the first CORESET information is switched to the second CORESET information on the first time-domain resource;
   wherein the first resource comprises a first frequency-domain sub-band and a second frequency-domain sub-band;
   the at least one first CORESET information corresponds to the first frequency-domain sub-band, and the at least one second CORESET information corresponds to the second frequency-domain sub-band; and
   the first frequency-domain sub-band and the second frequency-domain sub-band belong to different bandwidth parts (BWPs).

2. The method according to claim 1, wherein at least one of the at least one first CORESET information is different from at least one of the at least one second CORESET information.

3. The method according to claim 1, wherein the receiving at least one first control resource set (CORESET) information, comprises:
   obtaining, by the terminal, the at least one first CORESET information through configuration information of a bandwidth part (BWP).

4. The method according to claim 1, wherein the at least one first CORESET information and the at least one second CORESET information belong to a same search space;
   the first resource comprises a first time-domain resource; and
   in case that the terminal determines the at least one second CORESET information corresponding to the first time-domain resource based on the at least one first CORESET information and the first time-domain resource, the first time-domain resource is a PDCCH monitoring time-domain resource information comprised in the search space, and at least one of the at least one first CORESET information is different from at least one of the at least one second CORESET information; and
   wherein the receiving at least one first control resource set (CORESET) information, comprises:
   obtaining, by the terminal, the at least one first CORESET information through configuration information of the search space.

5. The method according to claim 1, wherein at least one of the at least one first CORESET information is different from at least one of the at least one second CORESET information.

6. The method according to claim 5, wherein a relative time-domain resource or a relative frequency-domain resource of at least one of the at least one first CORESET information in the first frequency-domain sub-band is the same as a relative time-domain resource or a relative frequency-domain resource of at least one of the at least one second CORESET information in the second frequency-domain sub-band.

7. The method according to claim 1, wherein the at least one first CORESET information belongs to a first search space, and the at least one second CORESET information belongs to a second search space.

8. The method according to claim 7, wherein,
   the first search space is a common search space, the second search space is a common public search space; or
   the first search space is a terminal-specific search space, the second search space is a terminal-specific search space.

9. A method of determining a control channel, comprising:
   sending, by a network device, at least one first control resource set (CORESET) information, wherein the at least one first CORESET information and a first resource are configured to enable a terminal to determine at least one second CORESET information corresponding to the first resource; and
   sending, by the network device, a physical downlink control channel (PDCCH), wherein the at least one second CORESET information is configured to enable the terminal to receive the PDCCH;
   wherein the first resource comprises a first time-domain resource, and correspondence between the at least one second CORESET information and the first resource comprises:
   the second CORESET information being valid on the first time-domain resource;

wherein the first CORESET information is switched to the second CORESET information on the first time-domain resource;
wherein the first resource comprises a first frequency-domain sub-band and a second frequency-domain sub-band;
the at least one first CORESET information corresponds to the first frequency-domain sub-band, and the at least one second CORESET information corresponds to the second frequency-domain sub-band; and
the first frequency-domain sub-band and the second frequency-domain sub-band belong to different bandwidth parts (BWPs).

10. The method according to claim 9, wherein at least one of the at least one first CORESET information is different from at least one of the at least one second CORESET information.

11. The method according to claim 9, wherein the sending at least one first control resource set (CORESET) information, comprises:
sending, by the network device, the at least one first CORESET information through configuration information of a bandwidth part (BWP).

12. The method according to claim 9, wherein at least one of the at least one first CORESET information is different from at least one of the at least one second CORESET information.

13. The method according to claim 12, wherein a relative time-domain resource or a relative frequency-domain resource of at least one of the at least one first CORESET information in the first frequency-domain sub-band is the same as a relative time-domain resource or a relative frequency-domain resource of at least one of the at least one second CORESET information in the second frequency-domain sub-band.

14. The method according to claim 9, wherein the at least one first CORESET information belongs to a first search space, and the at least one second CORESET information belongs to a second search space.

15. The method according to claim 14, wherein,
the first search space is a common search space, the second search space is a common search space; or
the first search space is a terminal-specific search space, the second search space is a terminal-specific search space.

16. An electronic device, comprising a memory and a processor, wherein the memory has a computer program stored therein,
wherein the processor is configured to run the computer program to perform operations of:
receiving at least one first control resource set (CORESET) information; and
receiving a physical downlink control channel (PDCCH) based on at least one second CORESET information, wherein the at least one second CORESET information is determined based on the at least one first CORESET information and a first resource, and the at least one second CORESET information corresponds to the first resource;
wherein the first resource comprises a first time-domain resource, and correspondence between the at least one second CORESET information and the first resource comprises:
the second CORESET information being valid on the first time-domain resource;
or the processor is configured to run the computer program to perform operations of:
sending at least one first control resource set (CORESET) information, wherein the at least one first CORESET information and a first resource are configured to enable a device to determine at least one second CORESET information corresponding to the first resource; and
sending the physical downlink control channel (PDCCH), wherein the at least one second CORESET information is configured to enable the device to receive the PDCCH;
wherein the first resource comprises a first time-domain resource, and correspondence between the at least one second CORESET information and the first resource comprises:
the second CORESET information being valid on the first time-domain resource;
wherein the first CORESET information is switched to the second CORESET information on the first time-domain resource; wherein
the first resource comprises a first frequency-domain sub-band and a second frequency-domain sub-band;
the at least one first CORESET information corresponds to the first frequency-domain sub-band, and the at least one second CORESET information corresponds to the second frequency-domain sub-band; and
the first frequency-domain sub-band and the second frequency-domain sub-band belong to different bandwidth parts (BWPs).

* * * * *